United States Patent [19]
Pitts

[11] 3,927,227
[45] Dec. 16, 1975

[54] METHOD FOR MANUFACTURING MIRRORS IN ZERO GRAVITY ENVIRONMENT

[75] Inventor: David E. Pitts, Houston, Tex.

[73] Assignee: The United States of America as represented by the United States National Aeronautics and Space Administration Office of General Counsel-Code GP, Washington, D.C.

[22] Filed: Feb. 27, 1974

[21] Appl. No.: 446,560

[52] U.S. Cl. .............. 427/162; 350/288; 350/293; 427/250
[51] Int. Cl.² .................... B32B 3/00; C23C 11/00
[58] Field of Search ............... 117/35 V, 35 R, 107; 350/288, 293; 427/162

[56] References Cited
UNITED STATES PATENTS

| | | |
|---|---|---|
| 1,584,728 | 5/1926 | Case .................................. 117/35 R |
| 2,145,732 | 1/1939 | Nickle .............................. 117/35 V |
| 3,326,624 | 6/1967 | Von Maydell et al. ............. 350/293 |
| 3,360,798 | 12/1967 | Webb ................................ 350/288 |
| 3,490,405 | 1/1970 | Reader et al. ..................... 350/293 |
| 3,541,569 | 11/1970 | Berks et al. ....................... 350/288 |
| 3,635,547 | 1/1972 | Rushing et al. ................... 350/288 |

*Primary Examiner*—William D. Martin
*Assistant Examiner*—Sadie L. Childs
*Attorney, Agent, or Firm*—Marvin J. Marnock; John R. Manning; Marvin F. Matthews

[57] ABSTRACT

A system for forming mirror surfaces in zero gravity environment by locating a shaped surface in a space orbit, orienting the central axis of the section toward the sun and vaporizing a finite amount of vaporizable metal (in amount calculated to provide a thin layer of metal) onto the surface of the section. A shaped surface can be formed by inflating a plastic to a spherical shape and hardening it.

3 Claims, 4 Drawing Figures

METHOD FOR MANUFACTURING MIRRORS IN ZERO GRAVITY ENVIRONMENT

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to methods and apparatus for forming large mirrors in space. In particular, it relates to methods and apparatus for coating a curved surface in a zero gravity environment with a vaporizable metal to form a mirror.

DESCRIPTION OF THE PRIOR ART

Use of large mirrors permit higher resolution and greater collection of power. Large mirrors are important for viewing the earth, for stellar astronomy and for planetary astronomy. Large mirrors are also needed to collect solar energy for possible solar energy conversion facilities in space. Mirrors can also be useful for space propulsion system or for directing solar energy onto clouds and/or the earth's surface. Mirrors manufactured on earth for use in space are costly and complex because of the necessity to manufacture them to resist the forces of launching. Thus, this invention relates to forming mirrors in space after launching.

SUMMARY OF THE INVENTION

The present invention relates to locating a hemispherical or paraboloid surface section in a space orbit. A vaporizable metal calculated to lay a thin relfective metal layer over the surface is located at the focus point for the surface and the surface section is aimed toward the sun. Vaporization of the metal provides a reflective coating to the surface section.

BRIEF DESCRIPTION OF THE DRAWINGS

Reference to the drawings will further explain the invention wherein like numerals refer to like parts, and in which.

DESCRIPTION OF THE PREFERRED EMBODIMENT

Figure 1:
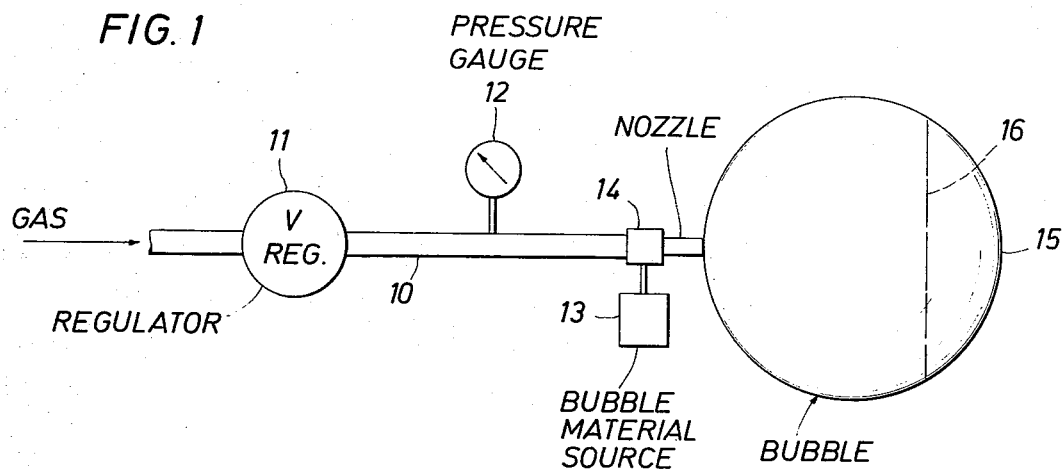
FIG. 1 is a schematic view of a system for developing a spherical surface section.

Referring now to FIG. 1, a system of forming a mirror surface in space is illustrated. In the zero gravity environment, very perfect hollow spheres may be manufactured in space by blowing bubbles of a material having sufficient surface tension ($\sigma$) to balance the internal pressure (P) at a radius (r). The relationship between these parameters is $$P = \frac{2\sigma}{r} \tag{1}$$

The surface tension required is in the range of 100 to 1000 dynes/cm., so that small pressures of 2.0 to 20 dynes/cm$^2$ are required for a bubble with a radius of 100 cm. As shown in FIG. 1, a tube or pipe 10 is provided to receive input gas through a gas regulator 11. A pressure gauge 12 may be used to monitor the pressure. A bubble material source 13 supplies plastic material to a nozzle 14 on the tube 10. The material is in a plastic state and the gas pressure causes it to inflate into a sphere 15. Surface tension during inflation causes the material to distribute evenly and the plastic bubble material can be hardened in one of the following ways:

a. evaporation of solvent,
b. exposure to heat of sun's rays,
c. exposure to ultraviolet or X-rays from the sun, or
d. exposure to cold--shadowed from sun.

Once the sphere 15 has hardened, a hole can be cut in the side or a segment cut along a circle (shown in dashed line as 16) to provide backing surface elements upon which aluminum can be deposited. Plastics for use in this process can be such as AYAT or AYAF polyvinyl acetate (Union Carbide Co.), which, when mixed one-to-one by weight with pure acetone, is capable of forming spheres. AYAT polyvinyl acetate is a grade of polyvinyl acetate formed as a long chain polymer having a molecular weight of 167,000. The AYAF grade has a molecular weight of 113,000. A polyvinyl acetate in this general grade range would be suitable for providing a durable backing surface.

Figure 2:
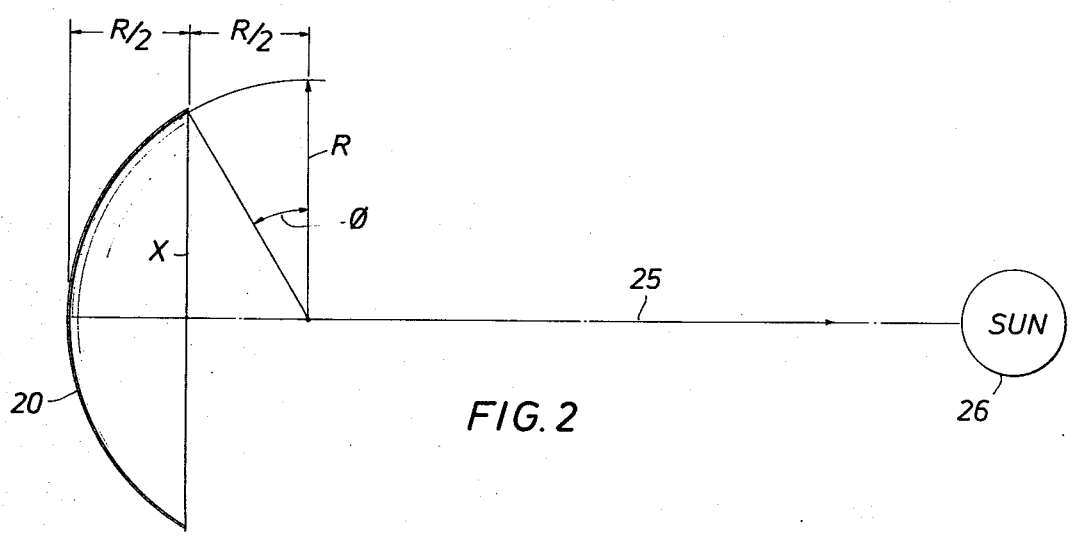
FIG. 2 is a partial view of a surface section and arrangement for autoaluminization of a mirror in a space environment.
Figure 3:
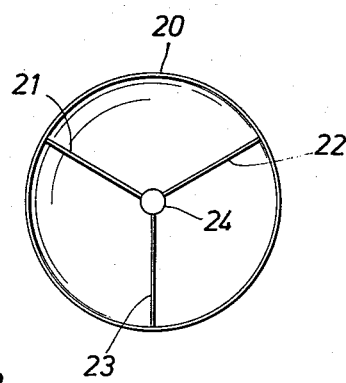
FIGS. 3 and 4 are front and side views of a hemispherical surface section.
Figure 4:
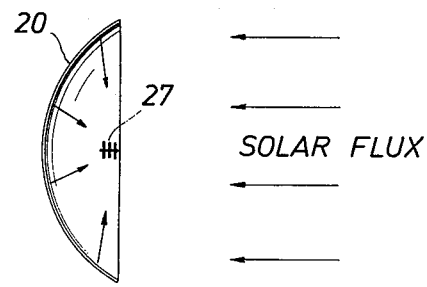

Referring now to FIG. 2, a section of a hemisphere 20 which is to be used as a mirror for some purpose, such as an astronomical telescope, solar power generation or the like. The hemisphere is disposed in a space orbital environment at an altitude of 200 km or higher. While a hemisphere is illustrated, it will be appreciated that a paraboloid can be used as well. A tungsten support consisting of equidistantly spaced support arms 21, 22 and 23 support a calculated amount of aluminum 24 or other vaporizable metal at the focus of the hemisphere. The hemisphere is then aligned with its central axis 25 toward the sun 26. The collection of solar flux unattenuated by the earth's atmosphere will be sufficient to vaporize the aluminum and deposit a thin aluminum coating on the inner surface of the hemisphere. It is preferable that the aluminum be in thin plates or discs 27 (FIG. 4) superimposed over one another.

The foregoing process may be better understood by consideration of the following example. Assume that the radius r of the hemispherical section is 50 cm. A thickness of aluminum required for a reflectivity of greater than 90% in the visible region of the spectrum is about 1 $\mu$m. The volume of aluminum on this hemispherical section with a thickness of 1 $\mu$m can be calculated from the formula $$\begin{aligned}V &= A \, \Delta r \\ &= \Delta r \int_{30}^{90} 2\pi r^2 \cos\phi \, d\phi \\ &= \Delta r \, 2\pi \, (57.735)^2 (1 - 0.5) \\ &= 1.0472 \text{ cm}^3\end{aligned} \tag{2}$$

Since the density of aluminum is 2.699 gm/cm, the mass of aluminum (M) required is 2.826 gms.

The available power from the sun is:
$$P = F_o \pi r^2$$
where $F_a = 2.0$ cal/(cm²min)
$P = 15707.96$ cal/min.

Now if the mirror has a plastic or glass composition and thus only 8% reflectance in the visible and near infrared and the aluminum target has a 70% reflectance, then the total power absorbed by the aluminum target is:

$P' = 376.991$ cal/min.

Properties of aluminum are:

| | |
|---|---|
| temperature for vapor pressure | — $10^{-2}$ mmHg (996°C) |
| boiling point | — 2057°C |
| melting point | — 659.7°C |
| specific heat | $C = 0.2667$ cal/gm°C |
| heat of fusion | = 76.8 cal/gm |

To overcome the latent heat of fusion, about 1.0 minute extra heating time is required.

Since the target is in a zero gravity environment when the aluminum melts, it will remain in the focus of the mirror, forming a sphere and being held in the area by the lack of forces and by the surface tension of the sphere interacting with the tungsten support.

The time required to vaporize the aluminum and coat the mirror is related to the temperature increase of the aluminum. The temperature increase of the aluminum (neglecting the conductivity) is described by the equation:

$$Mc \frac{\delta T}{\delta t} = P' - 2a \epsilon \sigma T^4 \quad (3)$$

where
$M = 2.826$ gm
$\epsilon = 0.2$ for the aluminum in the near infrared (peak emission for 1273°K is 2.27 micrometers)
$a = \pi r^2$ (area of the top of the right circular cylinder)
$r = 0.125$ cm radius of the right circular cylinder of aluminum
$\sigma = 5.6699 \times 10^{-12}$ watts (cm²°K⁴)

so that $$\frac{\delta T}{\delta t} = 500.101 - 2.39417 \times 10^{-12} T^4 \quad °K/min.$$

In order to intercept a circular area with a radius of 50 cm., the radius of curvature R of the hemispherical section must be 57.735 cm., the focal length is $r/2$ or 28.867 cm., the image size is $f \tan \theta$ where $\theta$ for the sun is 0.5°. Thus the image size for the sun is 0.2519 cm.

If it were assumed that aluminum radiates with a temperature of 1273°K at all times, the time required to get to a vapor pressure of $10^{-2}$ mmHg will be between the limits of 3.12 to 3.15 minutes. Once the vaporization starts, the reflectivity of the mirror increases and thus the available power is increased and the process will be completed very quickly.

In the foregoing description reference has been made to aluminum, however, it will be appreciated that other metals such as Barium, Bismuth, Calcium, Cadmium, Copper, Germamium, Lead, or Magnesium have equal utility in this process.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. A method for manufacturing a mirror surface in a zero gravity environment comprising the steps of
    locating a structure defining a concave surface in the form of a spherical segment or paraboloid of revolution in a space orbit having a zero gravity environment,
    providing a vaporizable metal at the focus of said surface in an amount calculated to provide a thin layer of metal on said surface, and
    orienting the central axis of said surface toward the sun thereby vaporizing said metal by solar heat and depositing the vaporized metal on said surface.

2. The method as defined in claim 1 wherein said vaporizable metal is aluminum.

3. The method as defined in claim 2 wherein said space orbit is at least 200 km from the surface of earth.

* * * * *